United States Patent
Biswas et al.

(10) Patent No.: US 7,542,463 B2
(45) Date of Patent: Jun. 2, 2009

(54) COMMUNICATING PACKETS ALONG A CONTROL CHANNEL AND A MEDIA CHANNEL

(75) Inventors: Kaushik P. Biswas, San Jose, CA (US); Thimmappa Thejaswi, Cupertino, CA (US); Senthil M. Sivakumar, Cupertino, CA (US); Siva S. Jayasenan, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 707 days.

(21) Appl. No.: 10/950,288

(22) Filed: Sep. 24, 2004

(65) Prior Publication Data

US 2006/0072561 A1  Apr. 6, 2006

(51) Int. Cl.
  *H04J 11/00* (2006.01)
(52) U.S. Cl. .................................... 370/352; 370/466
(58) Field of Classification Search ......... 370/352–356, 370/466, 467, 389; 709/245
  See application file for complete search history.

(56) References Cited

U.S. PATENT DOCUMENTS

| | | | |
|---|---|---|---|
| 4,476,524 A | 10/1984 | Brown et al. ............. 710/306 |
| 5,333,132 A | 7/1994 | Chuniaud et al. .......... 370/516 |
| 5,436,898 A | 7/1995 | Bowen et al. .............. 370/352 |
| 5,442,802 A | 8/1995 | Brent et al. ................ 718/100 |
| 5,461,721 A | 10/1995 | Cormier et al. ............. 711/2 |
| 5,519,689 A | 5/1996 | Kim ........................ 370/232 |
| 5,771,350 A | 6/1998 | Kim ........................ 709/250 |
| 6,049,528 A | 4/2000 | Hendel et al. ............. 370/235 |
| 6,128,664 A * | 10/2000 | Yanagidate et al. ........ 709/228 |
| 6,163,541 A | 12/2000 | Casey et al. ............ 370/395.51 |
| 6,560,707 B2 | 5/2003 | Curtis et al. ............... 713/163 |
| 6,735,723 B2 | 5/2004 | Park et al. ................. 714/701 |
| 6,772,335 B2 | 8/2004 | Curtis et al. ............... 713/163 |
| 2004/0252683 A1* | 12/2004 | Kennedy et al. ........... 370/389 |
| 2005/0201357 A1* | 9/2005 | Poyhonen .................. 370/352 |

* cited by examiner

*Primary Examiner*—Ricky Ngo
*Assistant Examiner*—Dady Chery
(74) *Attorney, Agent, or Firm*—Baker Botts L.L.P.

(57) ABSTRACT

Communicating packets along a control channel and a media channel includes receiving at a network address translator a first message having a first internal address from a first communication device. The first internal address is translated to a first external control address operable to route a control packet along a control channel. A second message having a first embedded media address is received from the first communication device. The first embedded media address is translated to a first external media address operable to route a media packet along a media channel.

20 Claims, 2 Drawing Sheets

COMMUNICATING PACKETS ALONG A CONTROL CHANNEL AND A MEDIA CHANNEL

TECHNICAL FIELD

This invention relates generally to the field of communications and more specifically to communicating packets along a control channel and a media channel.

BACKGROUND

Control traffic typically includes signaling messages, and media traffic typically includes voice or data information. Typically, media traffic is heavier than control traffic. Media traffic may be routed through a media channel separate from a control channel carrying control traffic. Known techniques for using control and media channels, however, are not efficient in certain situations. It may be desirable to efficiently use control and media channels in certain situations.

SUMMARY OF THE DISCLOSURE

In accordance with the present invention, disadvantages and problems associated with previous techniques for communicating packets along a control channel and a media channel may be reduced or eliminated.

According to one embodiment of the present invention, communicating packets along a control channel and a media channel includes receiving at a network address translator a first message having a first internal address from a first communication device. The first internal address is translated to a first external control address operable to route a control packet along a control channel. A second message having a first embedded media address is received from the first communication device. The first embedded media address is translated to a first external media address operable to route a media packet along a media channel.

Certain embodiments of the invention may provide one or more technical advantages. A technical advantage of one embodiment may be that a network address translator may be used to provide control and media channels. The network address translator may be readily modified to provide such channels, allowing for efficient implementation of the channels.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
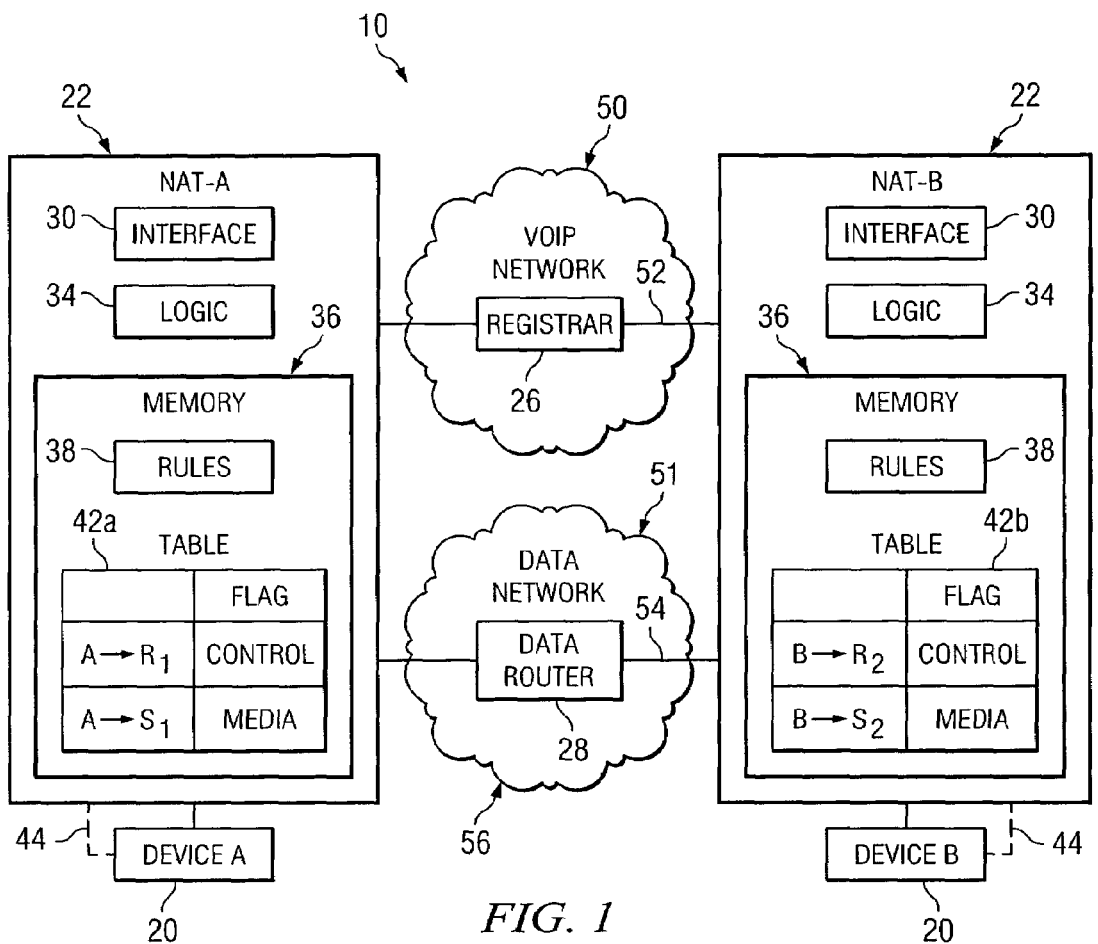
FIG. 1 is a block diagram of one embodiment of a system for communicating packets along a control channel and a media channel.
Figure 2:
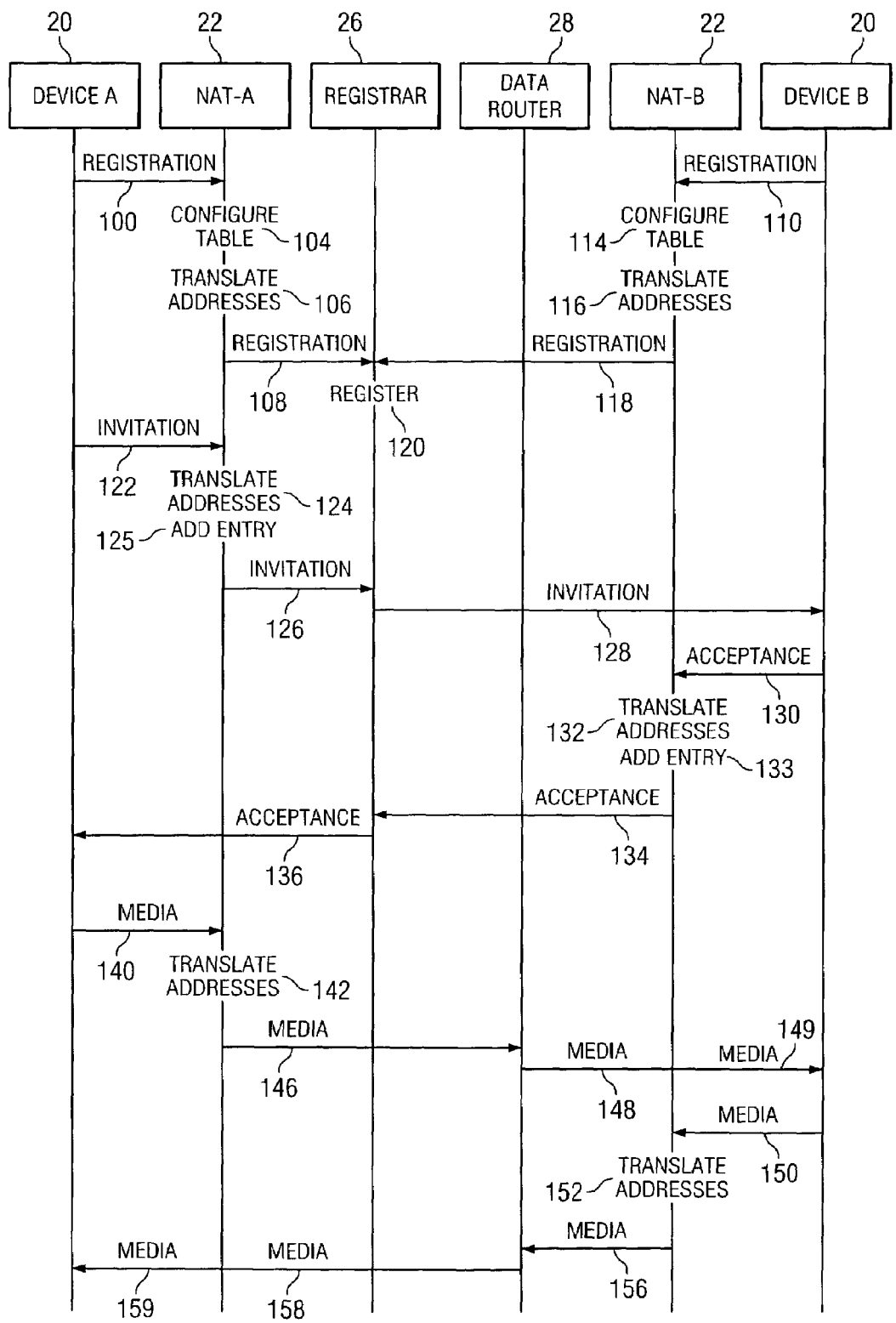
FIG. 2 is a flowchart of one embodiment of a method for communicating packets along a control channel and a media channel that may be used with the system of FIG. 1.

Embodiments of the present invention and its advantages are best understood by referring to FIGS. 1 and 2 of the drawings, like numerals being used for like and corresponding parts of the various drawings.

FIG. 1 is a block diagram illustrating one embodiment of a system 10 for communicating packets along a control channel and a media channel. According to the illustrated embodiment, communication devices 20 communicate with a system 10 that includes network address translators (NAT) 22, a registrar 26, and a data router 28 coupled as shown. In general, network address translators 22 translate addresses to direct control traffic to a control channel and to direct media traffic to a media channel.

According to the embodiment, communication devices 20 include a device A and a device B. A communication device 20 may comprise any hardware, software, firmware, or combination of the preceding operable to communicate with system 10. For example, a communication device 20 may comprise a personal digital assistant, a telephone, a mobile handset, a gateway, a router, a switch, or any other device suitable for communicating data packets to and from system 10.

According to the embodiment, each communication device 20 has a default route 44 pointing to its respective network address translator 22. According to the illustrated example, device A has a default route 44 pointing to NAT-A, and device B has a default route 44 pointing to NAT-B.

Communication devices 10 and system 10 may communicate using data packets. A packet may comprise a bundle of data organized in a specific way for transmission. A packet includes one or more headers and a payload. A header includes a source address and a destination address. The headers of a packet may comprise, for example, an IP header and a User Datagram Protocol (UDP) header.

The payload may include application specific data such as Voice Over Internet Protocol (VoIP) specific data. The payload may include a signaling message or other traffic control message, media information, media content, or any combination of the preceding. Media information may include an embedded address. Media content may include voice, data, multimedia, other information, or any combination of the preceding. A control packet typically includes a traffic control message, and a media packet typically includes media content.

A control channel may refer to a logic channel that carries control traffic, which includes control packets. According to the illustrated embodiment, control channel 52 carries control traffic from device A and device B to registrar 26. Control traffic may be associated with standard ports. A media channel may refer to a logic channel that carries media traffic, which includes media packets. According to the illustrated embodiment, media channel 54 carries media-traffic between device A and device B through data router 28. Media traffic may be associated with non-standard ports.

According to the illustrated embodiment, network address translators 22 include NAT-A and NAT-B. A network address translator (NAT) 22 translates between internal addresses associated with an internal network and external addresses associated with an external network. In general, a network may comprise any of or any suitable combination of the following: a public switched telephone network (PSTN), a public or private data network, a local area network (LAN), a metropolitan area network (MAN), a wide area network (WAN), a global computer network such as the Internet, a wireline or wireless network, a local, regional, or global communication network, an enterprise intranet, or other suitable communication link.

An internal network may refer to a local, private, or other localized network, and may comprise, for example, a local area network or a virtual private network. An external network may refer to a global, public, or other extended network, and may comprise, for example, the Internet. The internal network and the external network may use different addresses for at least some entities. An internal address may refer to an address used within the internal network, and may be internally unique within the internal network. An external address may refer to an address used within the external network, and may externally unique within the external network. According to one embodiment, an internal address may comprise a local area network address, and an external address may comprise a IP address.

Translator 22 may be configured on a router at the border of the internal and external networks. When packets enter the internal domain, translator 22 translates the external addresses to internal addresses. When packets leave the internal domain, translator 22 translates the internal addresses to external addresses.

According to the illustrated embodiment, a network address translator 22 includes an interface 30, logic 34, and a memory 36 organized as shown. Interface 30 receives and sends data. "Interface" may refer to any suitable structure of a device operable to receive input for the device, send output from the device, or both, and may comprise one or more ports. Logic 34 manages the operation of module 22, and may comprise any suitable hardware, software, or combination of hardware and software. For example, logic 34 may include a processor. "Processor" may refer to any suitable device operable to execute instructions and manipulate data to perform operations.

"Memory" may refer to any structure operable to store and facilitate retrieval of information used by logic. Memory 36 comprise Random Access Memory (RAM), Read Only Memory (ROM), magnetic drives, disk drives, Compact Disk (CD) Drives, Digital Video Disk (DVD) drives, removable media storage, any other suitable data storage device, or a combination of any of the preceding.

Memory 36 includes rules 38 and a table 42. Logic 34 translates network addresses according to rules 38 and table 42. Table 42 includes entries for translating network addresses such as source addresses, destination addresses, and embedded addresses. The entries associate internal addresses with corresponding external addresses.

According to one embodiment, table 42 associates an internal address for a control packet with an external control address, and associates an internal address for a media packet with an external media address. A control address refers to an address that is used to route control traffic along control channel 52. According to one embodiment, the external control address may comprise the IP address of the IP header of the packet. A media address refers to an address used to route media traffic along media channel 54. Table 42 may also associate the source address of the IP header of a registration with the external control address, and associate an embedded address of a registration with the external control address.

According to the illustrated example, table 42a associates internal address A for control packets and the registration IP header source address with external control address $R_1$, and associates the internal address A for the media packets with external media address $S_1$. Table 92 includes flags to indicate if a translation rule is to be applied to a control packet or a media packet.

A rule 38 may be used to configure table 42 to include external media addresses. For example, a rule 38 may state that if a registration is received, the following is performed. First, an entry associating the external control address and the internal address for a control packet is created in table 42. Second, during an invitation and acceptance flow, an entry associating the external media address and the internal address for a media packet is created in table 42. Third, the source address of the IP header of the registration is translated to the external control address, and the embedded address of the payload of the registration is translated to the external media address.

A rule 38 may state that when a control packet is received from the internal network, the source address is translated to an external control address. Similarly, another rule 38 may state that when a media packet is received, the source address is translated to an external media address.

Interface 30, logic 34, and memory 38 may be integrated or separated according to particular needs. For example, the present invention contemplates the functions of both logic 34 and memory 36 being provided using a single device, for example, a single integrated circuit. If logic 34 and memory 36 are separated, interface 20 may be coupled to logic 34 using a bus or other suitable link.

Registrar 26 accepts registration requests and registers devices 20. Registrar 26 may comprise a server that may be co-located with a proxy or redirect server that offers location services. Voice over Internet Protocol (VoIP) network 50 allows registrar 26 to communicate with other networks or devices. Data router 28 routes media packets. Data network 51 allows data router 28 to communicate with other networks or devices. VoIP network 50 may support VoIP, for example, SIP, X323, X333, SKINNY, other protocol, or any combination of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of logic 34 and memory 36 may be performed by one module, or the operations of logic 34 may be performed by more than one module. Additionally, operations of system 10 may be performed using any suitable logic comprising software, hardware, other logic, or any suitable combination of the preceding. As used in this document, "each" refers to each member of a set or each member of a subset of a set.

FIG. 2 is a flowchart illustrating one embodiment of a method for communicating packets along a control channel and a media channel. According to the embodiment, a packet may include, for example, an IP header, a UDP header, and payload.

The method begins at step 100, where device A sends a registration to registrar 26 through NAT-A. The IP header of the registration includes a source address comprising internal address A, and the payload includes an embedded header and a VoIP registration message.

NAT-A configures table 42a at step 104 by adding an entry for device A. For example, the entry associates the internal address A for a control packet and the registration IP header source address with an external control address $R_1$. NAT-A translates the source address according to table 42a at step 106. For example, internal address A is translated to external control address $R_1$. NAT-A forwards the registration message to registrar 26 at step 108 to register device A using external control address $R_1$.

Device B sends a registration message to NAT-B at step 110. The IP header of the registration message includes a source address comprising internal address B. The payload includes an embedded header and a VoIP registration message.

NAT-B configures table 42*b* at step 114 by adding an entry for device B. For example, an entry associates the internal address B for a control packet and the registration IP header source address with an external control address $R_2$. NAT-B translates the source address according to table 42*b* at step 116. For example, internal address B is translated to external control address $R_2$. NAT-B forwards the registration message to registrar 26 at step 118 to register device B using external control address $R_2$.

The devices are registered by registrar 26 at step 120. Device A is registered using external control address $R_1$, and device B is registered using external control address $R_2$.

Steps 122 through 136 describe establishing a call between device A and device B. Device A sends an invitation to establish a call with device B at step 122. The IP header of the invitation includes a source address comprising internal address A. The payload includes an embedded header, an invitation control message, and media information. The media information includes an embedded media address for device A.

NAT-A translates the source address according to table 42*a* at step 124. For example, internal address A is translated to external control address $R_1$, and the embedded media address is translated to external media address $S_1$. NAT-A forwards the invitation to registrar 26 at step 126. NAT-A adds an entry for device A to table 42*a* at step 125. The entry associates device A with the external media address, for example, the entry associates internal address A for a media packet with external media address $S_1$. Registrar 26 forwards the invitation to device B at step 128 to inform device B of the external media address $S_1$ of A.

Device B sends an acceptance to the invitation at step 130. The IP header of the acceptance includes a source address comprising internal address B. The payload includes an embedded header, an acceptance control message, and media information. The media information includes an embedded media address for device B.

NAT-B translates the source address according to table 42*b* at step 132. For example, internal address B is translated to external control address $R_2$, and the embedded address is translated to external media address $S_2$. NAT-B forwards the acceptance to registrar 26 at step 134. NAT-B adds an entry for device B to table 42*b* at step 133. The entry associates device B with the external media address, for example, the entry associates internal address B for a media packet with external media address $S_2$. Registrar 26 forwards the acceptance to device B at step 136 to inform device A of the external media address $S_2$ of B. Although devices A and B are known as $R_1$ and $R_2$ in VoIP network 50 for signaling purposes, they are known as $S_1$ and $S_2$ in data network 51 for media transfer.

Steps 140 through 156 describe routing media traffic through media channel 54. Device A sends a media message to device B through NAT-A at step 140. The IP header of the media packet includes a source address comprising internal address A and destination address $S_2$. The payload comprises media content. NAT-A translates the source address according to table 42*a* at step 142. For example, internal address A for the media portion is translated to external media address $S_1$. NAT-A forwards the media message to data router 28 at step 146. Data router 28 forwards the media message to NAT-B at step 148. NAT-B forwards the media message to device B at step 149 by translating external media address $S_2$ to internal address B.

Device B sends a media message to device A through NAT-B at step 150. The IP header of the media packet includes a source address comprising internal address B and destination address $S_1$. The payload comprises media content. NAT-B translates the source address according to table 42*b* at step 152. For example, internal address B for the media portion is translated to external media address $S_2$. NAT-B forwards the media message to data router 28 at step 156. Data router 28 forwards the media message to NAT-B at step 158. NAT-A forwards the media message to device A at step 159 by translating external media address $S_1$ to internal address A. The method then terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a network address translator may be used to provide control and media channels. The network address translator may be readily modified to provide such channels, allowing for efficient implementation of the channels.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for communicating a plurality of packets along a control channel and a media channel, comprising:

receiving at a network address translator a first message from a first communication device, the first message comprising a first internal address for the first communication device;

associating, at the network address translator, the first internal address to a first external control address, the first external control address operable to route a control packet along a control channel;

translating, at the network address translator, the first internal address to the first external control address to route a registration along the control channel to register the first communication device using the first external control address;

receiving at the network address translator a second message from the first communication device, the second message comprising a first embedded media address for the first communication device, the first internal address different from the first embedded media address;

associating, at the network address translator, the first embedded media address to a first external media address, the first external media address operable to route a media packet along a media channel; and translating, at the network address translator, the first embedded media address of a plurality of media packets to the first external media address to route the media packets along the media channel.

2. The method of claim 1, further comprising:

forwarding the first external media address from the first communication device to a second communication device;

forwarding a second external media address from the second communication device to the first communication device, the second external control address operable to route a media packet along the media channel; and communicating a plurality of media packets along the media channel using the first external media address and the second external media address.

3. The method of claim 2, wherein forwarding the first external media address from the first communication device to the second communication device further comprises forwarding an invitation from the first communication device to the second communication device, the invitation comprising the first external media address.

4. The method of claim 2, wherein forwarding the second external media address from the second communication device to the first communication device further comprises forwarding an acceptance from the second communication device to the first communication device, the invitation comprising the second external media address.

5. A network address translator system for communicating a plurality of packets along a control channel and a media channel, comprising:
an interface operable to receive a registration from a first communication device, the registration comprising a first internal address and a first embedded address for the first communication device; and logic coupled to the interface and operable to:
receive at a network address translator a first message from a first communication device, the first message comprising a first internal address for the first communication device;
associate, at the network address translator, the first internal address to a first external control address, the first external control address operable to route a control packet along a control channel;
translate, at the network address translator, the first internal address to the first external control address to route a registration along the control channel to register the first communication device using the first external control address;
receive at the network address translator a second message from the first communication device, the second message comprising a first embedded media address for the first communication device, the first internal address different from the first embedded media address;
associate, at the network address translator, the first embedded media address to a first external media address, the first external media address operable to route a media packet along a media channel; and
translate, at the network address translator, the first embedded media address of a plurality of media packets to the first external media address to route the media packets along the media channel.

6. The system of claim 5, the logic further operable to:
forward the first external media address from the first communication device to a second communication device;
forward a second external media address from the second communication device to the first communication device, the second external control address operable to route a media packet along the media channel; and
communicate a plurality of media packets along the media channel using the first external media address and the second external media address.

7. The system of claim 6, the logic further operable to forward the first external media address from the first communication device to the second communication device by forwarding an invitation from the first communication device to the second communication device, the invitation comprising the first external media address.

8. The system of claim 6, the logic further operable to forward the second external media address from the second communication device to the first communication device by forwarding an acceptance from the second communication device to the first communication device, the invitation comprising the second external media address.

9. Logic for communicating a plurality of packets along a control channel and a media channel, the logic embodied in a medium and operable to:
receive at a network address translator a first message from a first communication device, the first message comprising a first internal address for the first communication device;
associate, at the network address translator, the first internal address to a first external control address, the first external control address operable to route a control packet along a control channel;
translate, at the network address translator, the first internal address to the first external control address to route a registration along the control channel to register the first communication device using the first external control address;
receive at the network address translator a second message from the first communication device, the second message comprising a first embedded media address for the first communication device, the first internal address different from the first embedded media address;
associate, at the network address translator, the first embedded media address to a first external media address, the first external media address operable to route a media packet along a media channel; and
translate, at the network address translator, the first embedded media address of a plurality of media packets to the first external media address to route the media packets along the media channel.

10. The logic of claim 9, further operable to:
forward the first external media address from the first communication device to a second communication device;
forward a second external media address from the second communication device to the first communication device, the second external control address operable to route a media packet along the media channel; and
communicate a plurality of media packets along the media channel using the first external media address and the second external media address.

11. The logic of claim 10, further operable to forward the first external media address from the first communication device to the second communication device by forwarding an invitation from the first communication device to the second communication device, the invitation comprising the first external media address.

12. The logic of claim 10, further operable to forward the second external media address from the second communication device to the first communication device by forwarding an acceptance from the second communication device to the first communication device, the invitation comprising the second external media address.

13. A system for communicating a plurality of packets along a control channel and a media channel, comprising:
means for receiving at a network address translator a first message from a first communication device, the first message comprising a first internal address for the first communication device;
means for associating, at the network address translator, the first internal address to a first external control address, the first external control address operable to route a control packet along a control channel;
means for translating, at the network address translator, the first internal address to the first external control address to route a registration along the control channel to register the first communication device using the first external control address;

means for receiving at the network address translator a second message from the first communication device, the second message comprising a first embedded media address for the first communication device, the first internal address different from the first embedded media address;

means for associating, at the network address translator, the first embedded media address to a first external media address, the first external media address operable to route a media packet along a media channel; and means for translating, at the network address translator, the first embedded media address of a plurality of media packets to the first external media address to route the media packets along the media channel.

14. A method for communicating a plurality of packets along a control channel and a media channel, comprising:

receiving at a network address translator a first message from a first communication device, the first message comprising a first internal address for the first communication device;

associating, at the network address translator, the first internal address to a first external control address, the first external control address operable to route a control packet along a control channel;

translating, at the network address translator, the first internal address to the first external control address to route a registration along the control channel to register the first communication device using the first external control address;

receiving at the network address translator a second message from the first communication device, the second message comprising a first embedded media address for the first communication device, the first internal address different from the first embedded media address;

associating, at the network address translator, the first embedded media address to a first external media address, the first external media address operable to route a media packet along a media channel;

forwarding the first external media address from the first communication device to a second communication device by forwarding an invitation from the first communication device to the second communication device, the invitation comprising the first external media address;

forwarding a second external media address from the second communication device to the first communication device by forwarding an acceptance from the second communication device to the first communication device, the invitation comprising the second external media address, the second external control address operable to route a media packet along the media channel; and translating, at the network address translator, the first embedded media address of a plurality of media packets to the first external media address to route the media packets along the media channel; and communicating the media packets along the media channel using the first external media address and the second external media address.

15. A system for communicating a plurality of packets along a control channel and a media channel, comprising:

a first network address translator operable to:
  associate a first internal address for a first communication device to a first external control address;
  associate a first embedded media address for the first communication device to a first external media address, the first internal address different from the first embedded media address;
  translate the first internal address to the first external control address to forward a first registration from the first communication device, the forwarded first registration comprising the first external control address for the first communication device, the first external control address operable to route a control packet along a control channel;
  forward an invitation from the first communication device, the forwarded invitation comprising the first external media address, the first external media address operable to route a media packet along a media channel; and
  translate the first embedded media address of a plurality of media packets to the first external media address to route the media packets along the media channel;

a second network address translator operable to:
  forward a second registration from a second communication device, the forwarded second registration comprising a second external control address for the second communication device, the second external control address operable to route a control packet along the control channel; and
  forward an acceptance from the second communication device, the forwarded acceptance comprising a second external media address, the second external media address operable to route a media packet along the media channel; and a registrar operable to:
  receive the first registration and the second registration;
  register the first communication device using the first external control address; and
  register the second communication device using the second external control address.

16. The system of claim 15, wherein the first network address translator and the second network address translator are operable to communicate a plurality of media packets using the first external media address and the second external media address.

17. A method for communicating a plurality of packets along a control channel and a media channel, comprising:

associating a first internal address for a first communication device to a first external control address;

translating the first internal address to the first external control address to forward a first registration from the first communication device, the forwarded first registration comprising the first external control address for the first communication device, the first external control address operable to route a control packet along a control channel;

forwarding a second registration from a second communication device, the forwarded second registration comprising a second external control address for the second communication device, the second external control address operable to route a control packet along the control channel;

receiving the first registration and the second registration;

registering the first communication device using the first external control address;

registering the second communication device using the second external control address;

associating a first embedded media address for the first communication device to a first external media address, the first internal address different from the first embedded media address;

forwarding an invitation from the first communication device, the invitation comprising the first external media address for the first communication device, the first external media address operable to route a media packet along a media channel;

forwarding an acceptance from the second communication device, the acceptance comprising a second external media address for the second communication device, the second external media address operable to route a media packet along the media channel; and translating the first embedded media address of a plurality of media packets to the first external media address to route the media packets along the media channel.

18. The method of claim 17, further comprising communicating a plurality of media packets using the first external media address and the second external media address.

19. A system for communicating a plurality of packets along a control channel and a media channel, comprising:

means for associating a first internal address for a first communication device to a first external control address;

means for translating the first internal address to the first external control address to forward a first registration from the first communication device, the forwarded first registration comprising the first external control address for the first communication device, the first external control address operable to route a control packet along a control channel;

means for forwarding a second registration from a second communication device, the forwarded second registration comprising a second external control address for the second communication device, the second external control address operable to route a control packet along the control channel;

means for receiving the first registration and the second registration;

means for registering the first communication device using the first external control address for the first communication device;

means for registering the second communication device using the second external control address for the second communication device;

means for associating a first embedded media address for the first communication device to a first external media address, the first internal address different from the first embedded media address;

means for forwarding an invitation from the first communication device, the invitation comprising the first external media address for the first communication device, the first external media address operable to route a media packet along a media channel;

means for forwarding an acceptance from the second communication device, the acceptance comprising a second external media address for the second communication device, the second external media address operable to route a media packet along the media channel; and means for translating the first embedded media address of a plurality of media packets to the first external media address to route the media packets along the media channel.

20. A system for communicating a plurality of packets along a control channel and a media channel, comprising:

a first network address translator operable to:
receive a first registration from a first communication device, the first registration comprising a first internal address for the first communication device;
translate the first internal address to the first external control address, the first external control address operable to route a control packet along a control channel;
receive an invitation from the first communication device, the invitation comprising a first embedded media address for the first communication device, the first internal address different from the first embedded media address;
translate the first embedded address to the first external media address, the first external media address operable to route a media packet along a media channel through; and a second network address translator operable to:
forward a second registration from a second communication device, the forwarded second registration comprising a second external control address for the second communication device, the second external control address operable to route a control packet along the control channel; and forward an acceptance from the second communication device, the forwarded acceptance comprising a second external media address, the second external media address operable to route a media packet along the media channel;

a registrar operable to:
receive the first registration and the second registration;
register the first communication device using the first external control address; and
register the second communication device using the second external control address; and the first network address translator and the second network address translator operable to communicate a plurality of media packets using the first external media address and the second external media address.

* * * * *